United States Patent
Brandsma

(10) Patent No.: US 7,068,916 B2
(45) Date of Patent: Jun. 27, 2006

(54) METHOD OF MASKING PICTURE DISPLAY TRANSITIONS UPON CHANGE-OVER OF THE VIDEO PLAYBACK SPEED

(75) Inventor: Ewout Brandsma, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1271 days.

(21) Appl. No.: 09/840,205

(22) Filed: Apr. 23, 2001

(65) Prior Publication Data

US 2001/0051035 A1    Dec. 13, 2001

(30) Foreign Application Priority Data

Apr. 25, 2000    (EP) ................... 00201478

(51) Int. Cl.
*H04N 5/91* (2006.01)
(52) U.S. Cl. .......................... 386/68; 386/46
(58) Field of Classification Search ............... 386/68, 386/69, 46, 72, 73, 6, 7, 52, 53
See application file for complete search history.

(56) References Cited

U.S. PATENT DOCUMENTS

| | | | | |
|---|---|---|---|---|
| 5,239,429 A | | 8/1993 | Hoshi | 360/72.1 |
| 5,377,051 A | * | 12/1994 | Lane et al. | 386/81 |
| 5,832,183 A | * | 11/1998 | Shinohara et al. | 706/20 |
| 5,881,202 A | | 3/1999 | Herz | 386/68 |
| 5,949,948 A | | 9/1999 | Krause et al. | 386/6 |
| 6,356,708 B1 | | 3/2002 | Krause et al. | |

FOREIGN PATENT DOCUMENTS

| | | |
|---|---|---|
| EP | 0814615 A2 | 6/1997 |
| WO | WO9719552 | 5/1997 |

* cited by examiner

*Primary Examiner*—Robert Chevalier
(74) *Attorney, Agent, or Firm*—Edward W. Goodman

(57) ABSTRACT

A method of reducing the response time upon a change-over between different display modes of a video display device, picture information from a first channel being displayed in one display mode and picture information from another channel being displayed in another display mode. Picture information from the one channel is simulated by picture information from the other channel. The two channels may carry different picture information.

13 Claims, 3 Drawing Sheets

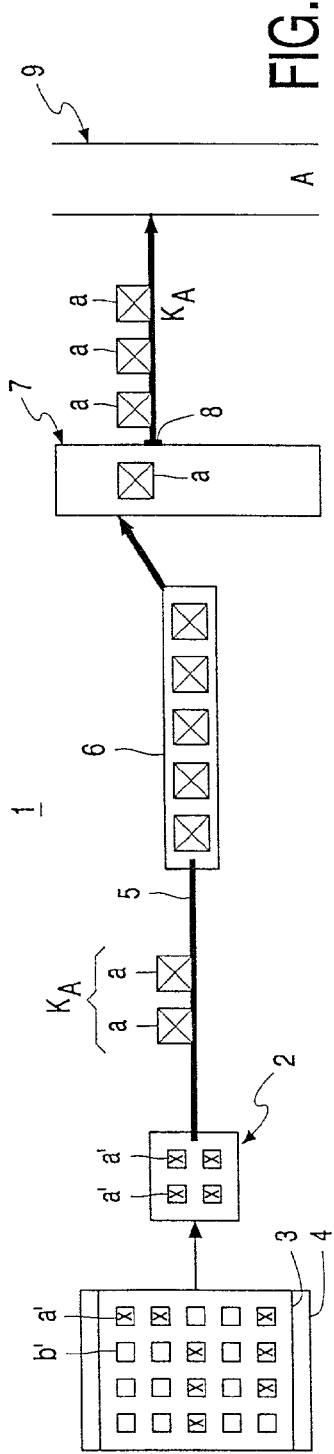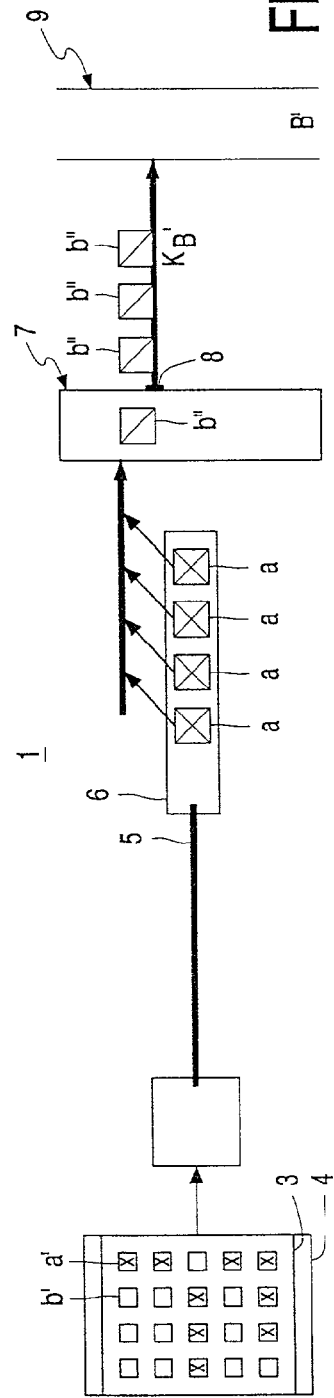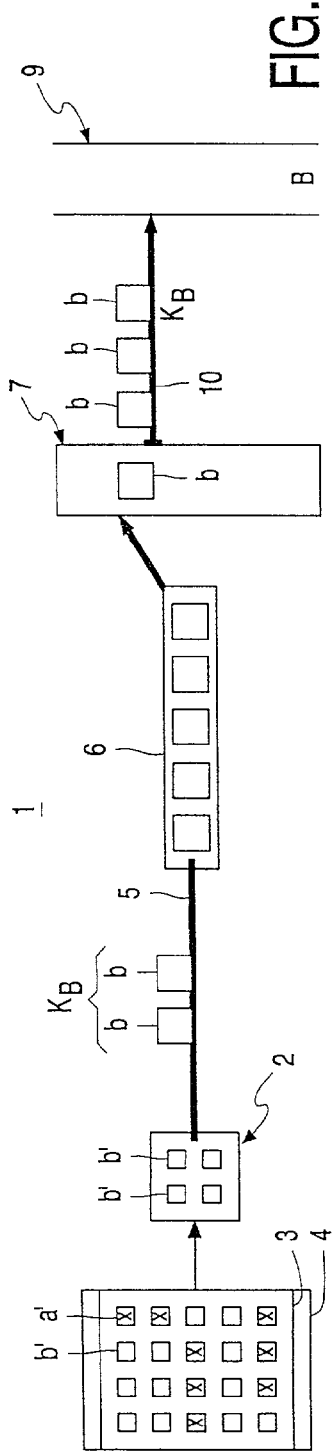

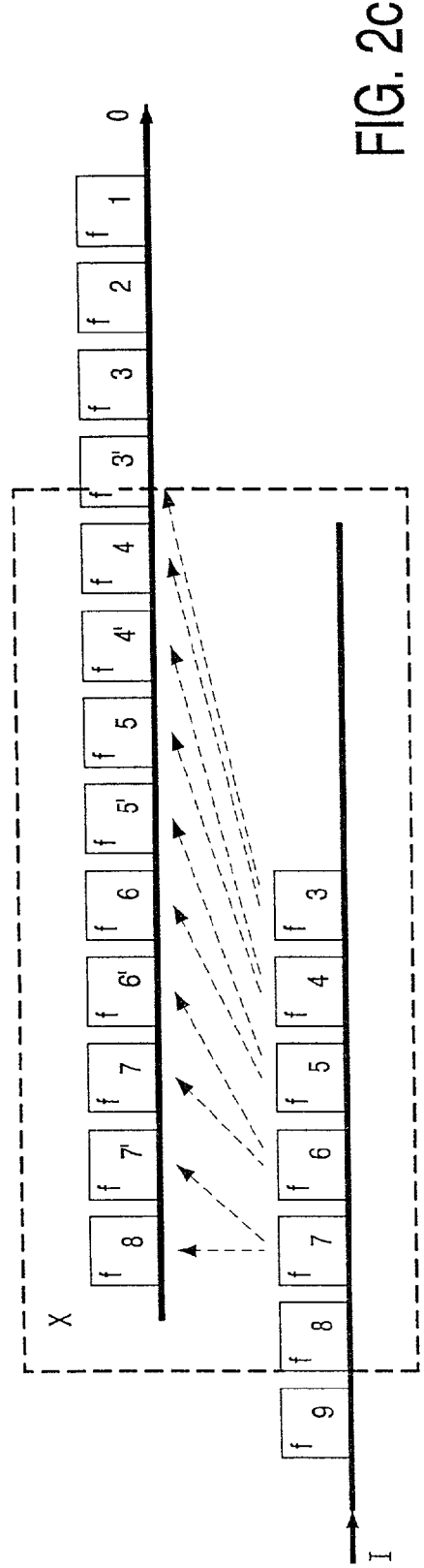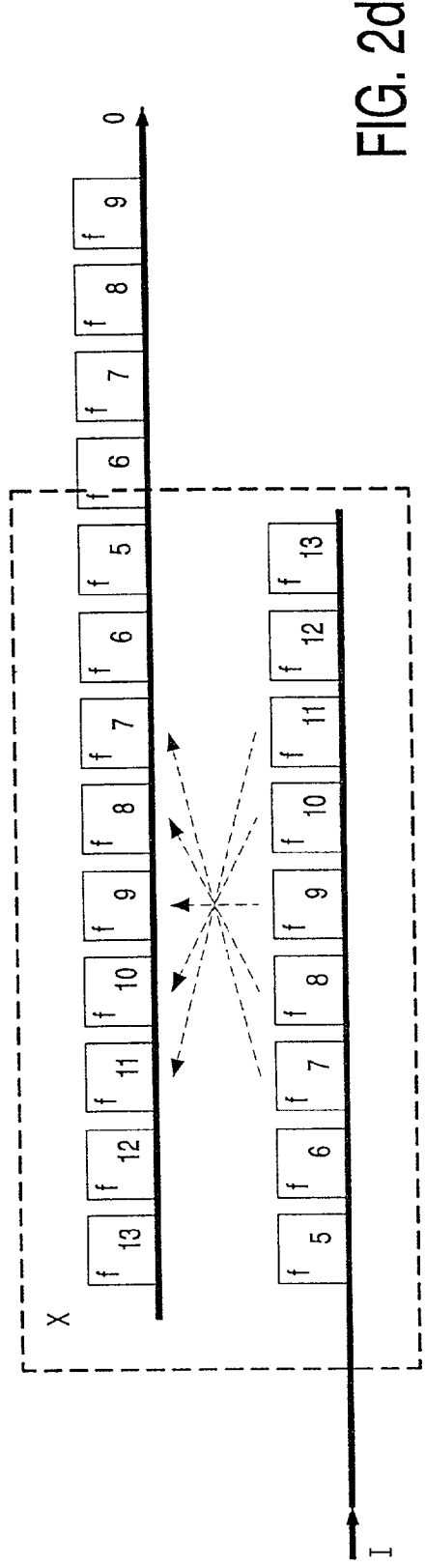

METHOD OF MASKING PICTURE DISPLAY TRANSITIONS UPON CHANGE-OVER OF THE VIDEO PLAYBACK SPEED

The invention relates to a method of reducing the response time upon a change-over between different display modes of a video display device, picture information from a first channel being displayed in the one display mode and picture information from another channel being displayed in another display mode. The invention also relates to a video display device in which said method is used.

The displayed picture information is available in channels made up of information read from information tracks of an information carrier at a given reading speed. To change the playback speed of a video display device in the case of digital video, just as is customary in the case of analog video, separate channels can be used for playback at higher playback speeds, i.e. the information from the primary channel, which is read at a normal playback speed, is not read at a different playback speed but, instead of this, a secondary channel is read, depending on the selected speed. In this respect, it is to be noted that in the case of analog video (for example, VHS) the information tracks for the higher speed channels form a subset of the information track for the normal playback speed. In the case of digital video (such as, for example, D-VHS) the secondary channels form a physically disjunct information track, which is not read at the normal speed and which contains picture information representing the secondary channel. Since the information in this secondary channel has a lower picture quality and since the information track is scanned more rapidly, a comparatively small claim is made upon additional storage capacity of the information carrier. Thus, it is possible, for example, to build up a picture with a quality of 9 Mb/s from information stored in a primary channel. In order to enable this picture information with a picture quality of, for example, 2 Mb/s to be played back at higher speeds, for example of forward and reverse speeds of ±4×, ±12× and ±24× the normal playback speed, the information carrier contains specific picture information for this purpose in secondary channels, which channels can be read at these respective speeds. The additional tape width in comparison with the 9 Mb/s picture signal is then comparatively small, i.e. for the total of these speeds it amounts to $2\times(\frac{1}{4}+\frac{1}{12}+\frac{1}{24})\times 2$ Mb/s=1.5 Mb/s, in six secondary channels, which demands approximately 16.7% additional storage capacity on the tape. It is evident that the search time between these secondary channels and the primary channel should be short; the corresponding information tracks should therefore have a certain degree of interleaving.

Reading out the secondary channels can then be effected as follows in a conventional digital video display device. In such a device digital picture information has been recorded in tracks on a magnetic tape. These tracks can be read by a rotating helical scan read head. When the speed at which the tape is fed through is increased, while the speed of the rotating read head is maintained constant, the head can read only certain portions of the tracks. By recording in these tracks the picture information that specifically corresponds to this speed the change-over time between the various playback speeds is comparatively small because this change-over takes as much time as setting the new tape speed, which can take place comparatively rapidly.

However, in a video display device which can read and write simultaneously this method cannot be adapted. In such a device a block read/write system usually reads and writes separate information blocks alternately, the tape being continually wound and rewound between tape portions with blocks to be read and free tape portions in which an information block can be written. The tape width of the magnetic tape should then be considerably larger than twice the tape width for reading/writing the picture information. By keeping good account of the blocks being written it is possible to achieve that the average relative distance between a recorded block and a free tape portion is always kept comparatively small, as a result of which the search time between the various block operations remains small. Furthermore, in some read/write systems it is possible that, when the information blocks which make up the primary channel are read, the blocks making up the secondary channel are read simultaneously, while the picture information of this channel is not displayed. During change-over from the normal playback speed (of, for example, 9 Mb/s) to higher playback speeds (for example, 2 Mb/s) the information from the secondary channels is then available almost immediately without search time losses and buffered information from the secondary channel van be displayed directly. As a result of this, the change-over time from the normal playback speed to a higher playback speed can then remain small. However, many systems do not have the possibility of simultaneously reading blocks from primary and secondary channels. In any case, such a read/write system is more complex.

Conversely, in the 2 Mb/s higher playback speed mode it is very often definitely impossible to also read and buffer the information for the normal playback speed mode because the video display device is not capable of realizing the required large bandwidth. If the information of the normal playback speed is to be read concurrently at a higher speed this will require, for example, 24×9 Mb/s=216 Mb/s at 24× the normal playback speed. As a result of this, the video display device cannot immediately display pictures at the normal speed upon the change-over from the 'fast' playback mode to the 'normal' playback mode.

As a result of this, and as a result of the extra time involved in searching for the information blocks making up the primary channel, the change-over time from the 'fast' playback mode to the 'normal' playback mode is unacceptably long for a user.

It is an object of the invention to eliminate the drawback described above and to provide a method of changing the playback speed of a video display device where the transition between the various playback modes of a video display device seems to be virtually instantaneous to a user. This object is achieved with a method of the type defined in the opening paragraph, in which picture information from the one channel is simulated by picture information from the other channel. By means of the method in accordance with the invention it is achieved that during the time required by the video display device to search and build up another channel this channel is initially simulated by the information still available from the other channel. This reduces the response time because a user can hardly discern that the pictures displayed during the first moments are still from the other channel but now in another display mode. Once the system has 'found' the other channel, in that the relevant information blocks or track portions on the information carrier have been found and the other channel can be set up by means of this information, which typically requires one or a few seconds time, simulation is terminated and the picture display is continued with picture information from the other channel.

It is to be noted that from WO-A-97 19 552 it is known per se to display information at different speeds by skipping pictures or by repeatedly displaying them. However, from said patent specification it cannot be inferred that this can be utilized in order to reduce the response time during a change-over between different display modes.

Moreover, it is known from U.S. Pat. No. 5,239,429 for as long as a tape is wound to another part to display frames stored in a buffer memory repeatedly with the aid of a decoder. It is also described that frames may be skipped when the buffer overflows. However, repeating or skipping of frames is not effected in order to reduce the response time in the case of a change-over between different display modes but is the response of the decoder to an empty or overflowing buffer.

For the use of the invention it is possible that the one channel carries information formed by a part of the information from the other channel, as described hereinbefore in the example of the helical scan read head. The information channels then are not strictly different from one another but are made up of the same information track, which information track is read only partly and is scanned more rapidly in the one case. However, the invention is particularly advantageous when used in the case that the channels have a separate information content, particularly in the case that the picture quality of the picture information from the respective channels differs. As a special case of this the invention can be used when the playback speed of the picture information differs in the different display modes. It is evident that in the last-mentioned case the use of this method is a practical application, in order to be able to comply with the user's wish, which is commonly accepted in practice, to have the possibility of playing the picture information at different speeds. Changing over the video display device from the one channel to the other, as set forth hereinbefore, will always take some time in these cases, in which time the method in accordance with the invention is utilized.

In one variant picture frames from a first channel $K_1$ can be skipped selectively during a change-over from a first display mode to a second display mode, the playback speed in the second display mode being higher than the playback speed in the first display mode, picture information made up of picture frames being formed by information from the channel $K_1$ and the channel $K_2$ in the first and the second display mode, respectively. The playback speed in the first display mode can then be the speed for normal display. This variant has special advantages in the case that a user wishes a fast-motion display and, for this purpose, changes over to a faster display mode. In this case, as explained hereinbefore, the change-over of the video display device to a higher playback speed will require some time. In this intervening time the invention is used by skipping picture frames from the channel for the lower playback speed, which makes it possible to simulate a higher playback speed.

In another variant picture frames from a channel $K_3$ can be repeated selectively during a change-over from a third display mode to a fourth display mode, the playback speed in the third display mode being higher than the playback speed in the fourth display mode, picture information made up of picture frames being formed by information from the channel $K_3$ and the channel $K_4$ in the third and the fourth display mode, respectively. This variant has special advantages in the case that a user whishes a slow-motion display or wishes to change over from a higher playback speed to a lower playback speed. In this case, the change-over of the video display device to a lower playback speed will also require some time. In this intervening time the invention is used by the repetition of picture frames from the channel for the higher playback speed, as a result of which a lower playback speed can be simulated. In a modification of this, interpolation can be used to insert picture frames thus interpolated (?) between successive picture frames from a channel $K_5$ during a change-over from a fifth display mode to a sixth display mode, the playback speed in the fifth display mode being higher than the playback speed in the sixth display mode, picture information made up of picture frames being formed by information from the channel $K_5$ and the channel $K_6$ in the fifth and the sixth display mode, respectively. This modification has advantages over the afore-mentioned variant because the pictures thus delayed become less jerky. For that matter, these interpolation techniques are known per se, for example in order to calculate intermediate pictures for the conversion from 50 Hz to 100 Hz in the case of 100 Hz television images. Such techniques are also referred to as "motion estimation" and "motion compensation".

In still another variant picture frames from the channel $K_7$ can be displayed selectively in a reversed sequence during a change-over from a seventh display mode to an eighth display mode, the playback speed in the seventh display mode being directed oppositely to the playback speed in the eighth display mode, picture information made up of picture frames being formed by information from the channel $K_7$ and the channel $K_8$ in the seventh and the eighth display mode, respectively. This variant is useful in the case that a user wishes to change over from a forward playback speed to a reverse playback speed or vice versa. In the time required for changing over the invention is utilized in that picture frames from the channel for the forward or reverse playback speed are displayed in a reversed sequence, thus enabling a reverse playback speed to be simulated.

The invention further relates to a video display device including a conversion unit which converts picture information from the one channel in such a manner that it seems as though this modified picture information originates from the other channel. With such a conversion unit it is achieved that the invention can be utilized in a normal video display device without many adaptations. The conversion unit is activated upon change-over to another display mode. The unit converts information from the channel displayed before the change-over in such a manner that picture information from the channel to be changed over to is simulated by picture information from the first-mentioned channel. The device may include a buffer memory unit in which the picture information can be buffered, which picture information can be accessed by the conversion unit. The buffer memory unit stores picture frames before they are displayed. Since the buffer memory unit can be accessed by the conversion unit the conversion unit can carry out the first variant of the method described hereinbefore by selectively not displaying buffered picture frames; the second variant of the method described hereinbefore can be carried out by selectively repeating buffered picture frames; and the third variant of the method described hereinbefore can be carried out by selectively displaying buffered picture frames in a reversed sequence. The invention can be used in devices of several types, such as for example a device having a helical-scan read head. As set forth hereinbefore, there are also other possibilities of keeping the change-over times short in such a device. The invention can be used particularly advantageously in a device having means for reading and writing picture information from/into a magnetic carrier in a block-by-block fashion, particularly when this carrier is a magnetic tape; this is because the change-over times can be comparatively long in such a case.

The invention further relates to a digital video display device having at least display modes for a normal, fast forward and fast reverse playback speed and including a device having one of the characteristic features described hereinbefore.

The invention will now be described in more detail with reference to the drawings, in which FIG. 1a illustrates a situation for a video display device in a display mode A prior to a change-over to a display mode B;

FIG. 1b illustrates a situation for a video display device during the change-over, use being made of the invention;

FIG. 1c illustrates a situation for a video display device in a display mode B after the change-over;

Figure 2A:
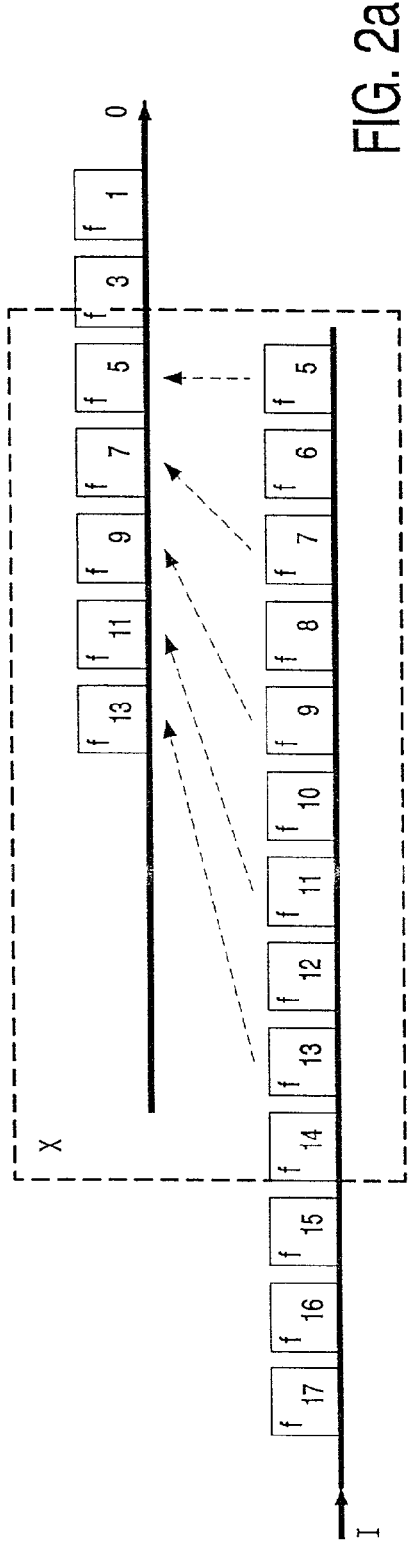
Figure 2B:
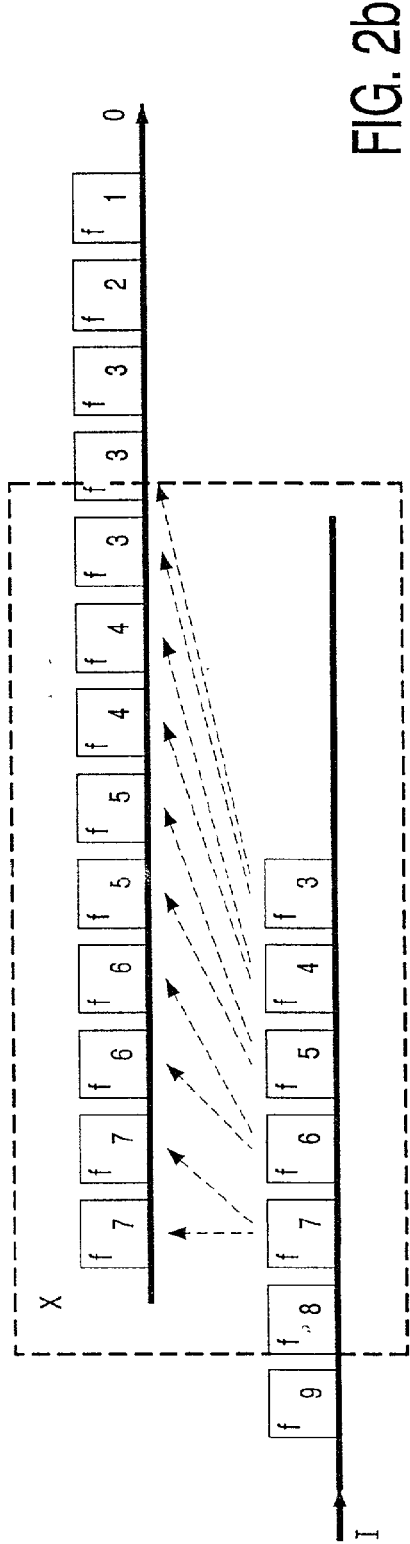

FIG. 2a diagrammatically represents a conversion in which a channel for display at twice the playback speed is simulated from a channel for display at a normal speed;

FIG. 2b diagrammatically represents a conversion in which a channel for display at a lower playback speed is simulated from a channel for display at a high speed;

FIG. 2c diagrammatically represents a conversion in which a channel for display at a lower playback speed is simulated from a channel for display at a high speed, using motion estimation; and FIG. 2d diagrammatically represents a conversion in which a channel with reverse display is simulated from a channel with forward display.

In FIG. 1 a video display device 1 displays picture information in the form picture frames a, b, b". The picture frames a, b are made up of information stored in information blocks a', b' by means of a read/write device 2. These information blocks a', b' are written in a track 3 on a magnetic tape 4.

FIG. 1a represents the situation prior to change-over, the video display device being in a display mode A. The picture information stream, which is made up of picture frames a and which represents a channel $K_A$, is transferred to a buffer memory 6 via a connection 5. The picture frames in this buffer memory 6, which is for example a RAM, can be retrieved by a processing unit 7. This processing unit 7 reads the buffer picture information from the buffer memory 6 and processes this information into a video signal for a display unit 9. For this purpose, the processing unit 7 has an output 8, from which the channel $K_A$ is transmitted to the display unit 9 via a connection 10. In the situation of FIG. 1a the processing unit 7 reads the picture frames a from the buffer memory 6 and transfers these directly to the output 8.

This is different in the situation illustrated in FIG. 1b. FIG. 1b shows the instant at which the video display device 1 is changed over from the display mode A to the display mode B. During this change-over the read/write device 2 no longer reads the information blocks a' but searches for the information blocks b'. This search takes some time. During this time no picture frames are produced and transferred to the buffer memory 6. This is indicated in FIG. 1b in that the read/write device does not contain any picture frame and picture frames are missing on the connection 5 and in the buffer memory 6. Since the buffer memory 6 contains enough picture frames the signal output from the video display device 1 can be sustained. However, in accordance with the invention the processing unit 7, instead of reading picture frames a from the buffer memory 6 and transferring them directly to the output 8, as in the case illustrated in FIG. 1a, converts picture information from the channel $K_A$ into picture information as though it originated from the other channel $K_B$. This conversion is effected by manipulation of the picture information available in the buffer memory 6 in the form of picture frames a. Hereinafter, a few possible methods of such a manipulation will be described. As a result of this conversion, it is not the picture frames a from the channel $K_A$ that are transmitted to the display unit 9 but processed picture frames b" simulating information from the channel $K_B$. Since for the user the picture information of the picture frames b" bear a strong resemblance to picture information of the picture frames b, the change-over seems to have taken place immediately. In reality, the situation illustrated in FIG. 1b typically lasts for a time of the order of one or a few seconds, as a result of which during this time a simulated video channel $K_B'$ is seen instead of the actual channel $K_B$.

FIG. 1c finally illustrates the situation after the change-over. The read/write device 2 is set to read the information blocks b' from the magnetic tape 4. The picture information, which now consists of picture frames b and which represents a channel $K_B$, is conveyed to the buffer memory 6 via the connection 5. The processing unit 7 reads the buffered picture information from the buffer memory 6 and thus produces a video signal, which is supplied to the display unit 9 via a connection 10.

FIG. 2 shows an input channel I, an output channel O, a conversion unit X and numbered picture frames. The picture frames are processed by the conversion unit X in accordance with the arrows P. Hereinafter, a few possible methods of manipulating the picture frames will be described, as carried out by the processing unit 7 in conjunction with the buffer memory 6 of FIG. 1.

FIG. 2a shows diagrammatically how a channel with picture frames for display at twice the playback speed is simulated from a channel with picture frames for display at the normal speed. The input channel I carries picture frames numbered $f_{17}, f_{16}, \ldots f_5$, of which the numbers $f_{13}, f_{12}, \ldots f_5$ can be manipulated by the conversion unit X. The conversion unit X leaves out the even numbers from the sequence $f_{13}, f_{12}, \ldots f_5$, as a result of which these picture frames no longer appear in the output channel O but merely the numbers $f_1, f_3, f_5, \ldots f_{13}$. Since the number of picture frames per unit of time remains constant the effect is obtained that the display is "compressed", so that the pictures appear to be displayed at a faster speed. It is obvious that the speed can be raised further by leaving out more pictures from the sequence.

FIG. 2b shows diagrammatically how a channel with picture frames at a lower playback speed can be simulated from a channel with picture frames for display at a high speed. The input channel carries picture frames numbered $f_9, f_8, \ldots f_3$, of which the numbers $f_7, f_6, \ldots f_3$, can be manipulated by the conversion unit X. The conversion unit X doubles the picture frames from the sequence $f_7, f_6, \ldots f_3$. A picture frame is thus displayed in the output channel during two units of time and, since the number of picture frames per unit of time remains constant, the effect is produced that the display is "expanded", so that the pictures appear to be displayed at a lower speed. It is obvious that the speed can be reduced further by more than doubling the pictures from the sequence.

FIG. 2c also shows diagrammatically how a channel with picture frames at a lower playback speed is simulated from a channel with picture frames for display at a high speed. The input channel I carries picture frames numbered $f_9, f_8, \ldots f_3$, of which the numbers $f_7, f_6, \ldots f_3$, can be manipulated by the conversion unit X. The conversion unit X calculates the intermediate pictures $f_7', f_6', \ldots f_3'$ by means of motion compensation techniques. After the display of a picture frame $f_i$ in the output channel the intermediate picture frame $f_i'$ is displayed before the picture frame $f_{i+1}$ is reproduced. Like in the situation illustrated in FIG. 2b, the pictures seem to be played at a lower speed. As a picture frame $f_i$ is followed by picture frame $f_i'$ calculated by motion compensation techniques, instead of said picture frame being simply repeated, the successive picture frames better blend into one another, as a result of which a smoother picture reproduction is obtained.

FIG. 2d finally shows diagrammatically how a channel with picture frames played in a reverse sequence is simulated from a channel with picture frames played in a forward sequence. The input channel I carries picture frames numbered $f_5, f_6, \ldots f_{13}$, which can all be manipulated by the conversion unit X. The conversion unit X displays the pictures in a reversed sequence, i.e. after the picture frames of the sequence $f_5, f_6, \ldots f_9$ have been output from the conversion unit in the forward mode, the supply in the input channel I ceases. The sequence of the residual picture frames $f_5, f_6, \ldots f_{13}$ is reversed, which produces the effect of a "reversed" reproduction. It is obvious that be selectively skipping or doubling picture frames the playback speed of the picture frames can be influenced. The conversion unit X has such a capacity that, when the pictures from the input channel I have finished, the device has changed over to a display mode normally intended for this purpose.

The invention claimed is:

1. A method of reducing the response time upon a change-over between different display modes of a video display device, picture information from a first channel being displayed in the one display mode and picture information from another channel being displayed in another display mode, characterized in that picture information from the one channel is simulated by picture information from the other channel during the period of change-over from the one display mode to the other display mode.

2. The method as claimed in claim 1, characterized in that the two channels carry different picture information.

3. The method as claimed in claim 1 or 2, characterized in that the picture quality of the picture information made up from the respective channels is different.

4. The method as claimed in any one of the claims 1 or 2, characterized in that the playback speed of the picture information differs in the different display modes.

5. The method as claimed in any one of the claims 1 or 2, characterized in that during a change-over from a first display mode to a second display mode, the playback speed in the second display mode being higher than the playback speed in the first display mode, picture frames from a first channel $K_1$ are skipped selectively, picture information made up of picture frames being formed by information from the channel $K_1$ and the channel $K_2$ in the first and the second display mode, respectively.

6. The method as claimed in claim 5, characterized in that the playback speed if the first display mode is the speed for normal display.

7. The method as claimed in any one of the claims 1 or 2, characterized in that during a change-over from a third display mode to a fourth display mode, the playback speed in the third display mode being higher than the playback speed in the fourth display mode, picture frames from a channel $K_3$ are repeated selectively, picture information made up of picture frames being formed by information from the channel $K_3$ and the channel $K_4$ in the third and the fourth display mode, respectively.

8. The method as claimed in any one of the claims 1 or 2, characterized in that during a change-over from a fifth display mode to a sixth display mode, the playback speed in the fifth display mode being higher than the playback speed in the sixth display mode, interpolation is used to insert picture frames between successive picture frames from a channel $K_5$, picture information made up of picture frames being formed by information from the channel $K_5$ and the channel $K_6$ in the fifth and the sixth display mode, respectively.

9. The method as claimed in any one of the claims 1 or 2, characterized in that during a change-over from a seventh display mode to an eighth display mode, the playback speed in the seventh display mode being directed oppositely to the playback speed in the eighth display mode, picture frames from the channel $K_7$ are displayed selectively in a reversed sequence, picture information made up of picture frames being formed by information from the channel $K_7$ and the channel $K_8$ in the seventh and the eighth display mode, respectively.

10. A video display device comprising means for reading and reproducing picture information from a plurality of channels, said video display device being operable in different display modes, picture information from a first channel being displayed in a first display mode and picture information from the other channel being displayed in a second display mode, characterized in that the device further comprises a conversion unit for converting picture information from the one channel into modified picture information, in such a manner that to a viewer of the video display device, this modified picture information seems to originate from the other channel.

11. The video display device as claimed in claim 10, characterized in that said video display device further comprises a buffer memory unit for buffering picture information, said picture information being accessed by the conversion unit.

12. The video display device as claimed in claim 10 or 11, characterized in that the video display device further comprises means for reading and writing picture information from/into a magnetic carrier in a block-by-block fashion.

13. A digital video display device having at least display modes for a normal, fast forward and fast reverse playback speed, said digital video display device comprises a video display device as claimed in claim 10.

* * * * *